(12) United States Patent
Nishio et al.

(10) Patent No.: US 7,846,282 B2
(45) Date of Patent: Dec. 7, 2010

(54) AUTOMOBILE FLOOR CARPET AND METHOD FOR MANUFACTURING THE SAME

(75) Inventors: Shigenori Nishio, Osaka (JP); Taro Hattori, Nara (JP)

(73) Assignee: Suminoe Textile Co., Ltd., Osakashi (JP)

( * ) Notice: Subject to any disclaimer, the term of this patent is extended or adjusted under 35 U.S.C. 154(b) by 479 days.

(21) Appl. No.: 11/700,012

(22) Filed: Jan. 31, 2007

(65) Prior Publication Data

US 2007/0178794 A1    Aug. 2, 2007

(30) Foreign Application Priority Data

Feb. 2, 2006    (JP)    ............................. 2006-025999

(51) Int. Cl.
  *B32B 5/24*    (2006.01)
  *B29C 65/52*    (2006.01)

(52) U.S. Cl. ...................... 156/78; 156/72; 156/244.27; 428/96; 428/97; 442/373

(58) Field of Classification Search .................... 156/72, 156/77, 78, 244.27; 428/96, 97; 422/373, 422/381, 388
  See application file for complete search history.

(56) References Cited

U.S. PATENT DOCUMENTS 3,497,414 A * 2/1970 Blue ........................... 428/85
3,537,946 A * 11/1970 Truax et al. .................... 428/97
3,770,558 A * 11/1973 Stahl ............................. 428/92
3,944,516 A * 3/1976 Petke ........................... 524/425
4,012,547 A * 3/1977 Smedberg ..................... 428/97
4,191,798 A * 3/1980 Schumacher et al. .......... 428/95
4,259,402 A * 3/1981 Cobbs et al. .............. 428/317.5
4,835,030 A * 5/1989 Squier et al. .................. 428/88
6,838,147 B2 * 1/2005 Burns et al. ................... 428/95
2003/0152742 A1 * 8/2003 Shimizu et al. ............... 428/95
2004/0197522 A1 * 10/2004 Reisdorf et al. ............... 428/97
2005/0159064 A1 * 7/2005 Rowell et al. ............... 442/327
2006/0003142 A1 * 1/2006 Shimizu et al. ............... 428/95
2006/0090832 A1 * 5/2006 Allison et al. .................. 156/72

FOREIGN PATENT DOCUMENTS

JP    1-7636    3/1989
JP    10-276888    10/1998

* cited by examiner

*Primary Examiner*—Michael A Tolin
(74) *Attorney, Agent, or Firm*—Edwards Angell Palmer & Dodge LLP

(57) ABSTRACT

In some embodiment, a method of manufacturing an automobile floor carpet comprises a step of pressing a nonwoven fabric 4, an adhesive film 3 obtained immediately after extruding thermoplastic resin having a melt flow rate of 10 to 1,000 g/10 min from an extruder 20, and a surface skin material 2 piled together in this order with a pair of rollers 21 and 22. With this manufacturing method, an automobile floor carpet excellent in sound absorption performance and also excellent in sound insulation performance can be manufactured.

6 Claims, 2 Drawing Sheets

AUTOMOBILE FLOOR CARPET AND METHOD FOR MANUFACTURING THE SAME

This application claims priority to Japanese Patent Application No. 2006-25999 filed on Feb. 2, 2006, the disclosure of which is incorporated by reference in its entirety.

BACKGROUND OF THE INVENTION

1. Field of the Invention

The present invention relates to, inter alia, an automobile floor mat and a method for manufacturing the same. More specifically, the preferred embodiments relate to an automobile floor mat enhanced in sound absorption performance and sound insulation performance and a method preferably used for manufacturing the same.

In this specification and claims, the wording of "melt flow rate" means a melt flow rate measured at a test temperature of 190° C. and a test load of 2.12N according to JIS K7210.

2. Related Art

Conventionally, a floor mat is disposed on a floor in an automobile for the purpose of, e.g., obtaining good step feeling and preventing transmission of vibrations from the floor side. For example, in a floor carpet enhanced in sound insulation performance against noise introduced into a passenger compartment from a floor side (e.g., engine room), it is known to line a rear side of a carpet backing material with a compound sheet containing inorganic filler in thermoplastic resin (see, e.g., Japanese Unexamined Laid-open Patent Publication No. H10-276888).

Furthermore, in an automobile floor carpet enhanced in sound absorption performance against noise introducing into a passenger compartment from, e.g., a roof, doors and windows to maintain quietness in an automobile, it is known that a surface skin layer and a felt-like sound absorbing member are integrally bonded via an air-permeable adhesive layer (see, e.g., Japanese Examined Laid-open Utility Model Publication No. H01-7636). Noise introducing into a passenger compartment via a roof, doors, windows, etc., reaches the felt-like sound absorbing member via the air-permeable adhesive layer to be absorbed by the felt-like sound absorbing member.

In the meantime, in recent years, in order to further enhance the comfort in an automobile, it has been strongly demanded to further enhance the quietness in an automobile. In the former sound insulation floor carpet, however, the sound absorption performance against noise introducing into a passenger compartment from, e.g., a roof, doors and windows was insufficient. In the latter sound absorbing floor carpet, the sound insulation performance against noise introducing into a passenger compartment from a floor side (e.g., engine room) was insufficient. Thus, in conventional automobile floor carpets, excellent quietness in a passenger compartment could not be attained since either the sound absorption performance or the sound insulation performance was insufficient. Under the circumstances, it has been demanded to develop an automobile floor carpet excellent in sound absorption performance and also excellent in sound insulation performance.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an automobile floor carpet excellent in sound absorption performance and also excellent in sound insulation performance and capable of sufficiently securing quietness in a passenger compartment.

Among other potential advantages, some embodiments can provide a method of manufacturing an automobile floor carpet excellent in sound absorption performance and also excellent in sound insulation performance and capable of sufficiently securing quietness in a passenger compartment.

In order to attain the aforementioned objects, some embodiments of the present invention provide the following means.

[1] A method of manufacturing an automobile floor carpet, comprising the step of:

pressing a nonwoven fabric, an adhesive film obtained immediately after extruding thermoplastic resin having a melt flow rate of 10 to 1,000 g/10 min from an extruder and a surface skin material piled together in this order with a pair of rollers.

[2] The method of manufacturing an automobile floor carpet as recited in the aforementioned Item 1, wherein the thermoplastic resin contains at least one foaming ingredient selected from the group consisting of an inorganic foaming agent, an organic foaming agent and a thermal expansion microcapsule.

[3] The method of manufacturing an automobile floor carpet as recited in the aforementioned Item 2, wherein the adhesive film obtained immediately after the extrusion is a film having a foaming rate of 1.1 to 5.

[4] The method of manufacturing an automobile floor carpet as recited in any one of the aforementioned Items 1 to 3, wherein the thermoplastic resin contains filler.

[5] A method of manufacturing an automobile floor carpet, comprising the step of:

pressing a nonwoven fabric, an adhesive film obtained immediately after extruding thermoplastic resin having melt viscosity of 5,000 to 30,000 mPa·s at an extrusion temperature from an extruder, and a surface skin material piled together in this order with a pair of rollers.

[6] The method of manufacturing an automobile floor carpet as recited in any one of the aforementioned Items 1 to 5, wherein the adhesive film is 50 to 500 g/m$^2$ in weight per unit area.

[7] The method of manufacturing an automobile floor carpet as recited in any one of the aforementioned Items 1 to 6, wherein the nonwoven fabric is 0.1 to 30 decitex in fineness of constituent fiber and 50 to 2,000 g/m$^2$ in weight per unit area.

[8] The method of manufacturing an automobile floor carpet as recited in any one of the aforementioned Items 1 to 7, wherein a carpet original fabric in which piles 200 to 4,000 g/m$^2$ in weight per unit area is implanted in an upper surface of a base fabric 50 to 200 g/m$^2$ in weight per unit area is used as the surface skin material.

[9] The method of manufacturing an automobile floor carpet as recited in any one of the aforementioned Items 1 to 7, wherein a needle-punched nonwoven fabric 50 to 1,000 g/m² in weight per unit area is used as the surface skin material.

[10] An automobile floor carpet having air-flow resistance of 600 to 12,450 N·S·m⁻³ manufactured by the method as recited in any one of the aforementioned Items 1 to 9.

According to the invention as recited in the aforementioned Item [1], since the melt flow rate of the thermoplastic resin constituting the adhesive film is 10 to 1,000 g/10 min and therefore the fluidity in a heated and melted state is large, a number of permeable pores will be generated in the adhesive film at the time of being pressed with the rolls. With this adhesive film having such permeable pores, the nonwoven fabric and the surface skin material are bonded. It is supposed that the adhesive film will be deformed so as to sufficiently fit on the uneven bonding surfaces of the nonwoven fabric and/or the surface skin material at the time of being pressed with the rollers due to the large fluidity of the thermoplastic resin constituting the adhesive film in the heated and molten state and the permeable pores will be formed due to generation of, e.g., cracks and perforations at the time of the deformation. According to this manufacturing method, since the air permeability especially as a carpet can be controlled so as to fall within an appropriate range, the obtained automobile floor carpet is excellent in sound absorption performance and also excellent in sound insulation performance, resulting in sufficient quietness in an automobile passenger compartment.

According to the invention as recited in the aforementioned item [2], since the thermoplastic resin contains foaming ingredient and therefore bubbles formed in the adhesive film become starting points (cores) for forming permeable pores, permeable pores can be more easily formed in the adhesive film at the time of being pressed with the rolls, resulting in further enhanced sound absorption performance.

According to the invention as recited in the aforementioned item [3], since the adhesion is performed by using the adhesive film having a foaming rate of 1.1 to 5, sufficient sound absorption performance can be secured while keeping sufficient bonding strength.

According to the invention as recited in the aforementioned item [4], since the thermoplastic resin contains filler and therefore the filler in the adhesive film becomes starting points (cores) for forming permeable pores, permeable pores can be more easily formed in the adhesive film at the time of being pressed with the rolls, forming more permeable pores in the adhesive film, which in turn can further enhance the sound absorption performance.

According to the invention as recited in the aforementioned item [5], since the melt viscosity of the thermoplastic resin constituting the adhesive film is 5,000 to 30,000 mPa·s at the extrusion temperature, a number of permeable pores will be generated in the adhesive film at the time of being pressed with the rolls. With this adhesive film having such permeable pores, the nonwoven fabric and the surface skin material are bonded. It is supposed that the adhesive film will be deformed so as to sufficiently fit on the uneven bonding surfaces of the nonwoven fabric and/or the surface skin material at the time of being pressed with the rollers and the permeable pores will be formed due to generation of, e.g., cracks and perforations at the time of the deformation. According to this manufacturing method, since the air permeability especially as a carpet can be controlled within an appropriate range, the obtained automobile floor carpet is excellent in sound absorption performance and also excellent in sound insulation performance, resulting in sufficient quietness in an automobile passenger compartment.

According to the invention as recited in the aforementioned item [6], the adhesive film is 50 to 500 g/m² in weight per unit area. The adhesive film 50 g/m² or more in weight per unit area can secure sufficient bonding strength, and the adhesive film 500 g/m² or less in weight per unit enhances formation of permeable pores at the time of being pressed, resulting in sufficient sound absorption performance.

According to the invention as recited in the aforementioned item [7], since a nonwoven fabric 0.1 to 30 decitex in fineness of constituent fiber and 50 to 2,000 g/m² in weight per unit area is used as the nonwoven fabric, the sound absorption performance can be further enhanced.

According to the invention as recited in the aforementioned item [8], an expensive-looking carpet excellent in sound absorbing carpet can be manufactured.

According to the invention as recited in the aforementioned item [9], since a needle-punched nonwoven fabric 50 to 1,000 g/m² in weight per unit area is used as the surface skin material, the sound absorption performance can be further enhanced.

According to the invention as recited in the aforementioned item [10], since the air-flow resistance of the carpet is 600 to 12,450 N·s·m⁻³, an automobile floor carpet further enhanced in sound absorption performance and sound insulation performance can be provided.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

Figure 1:
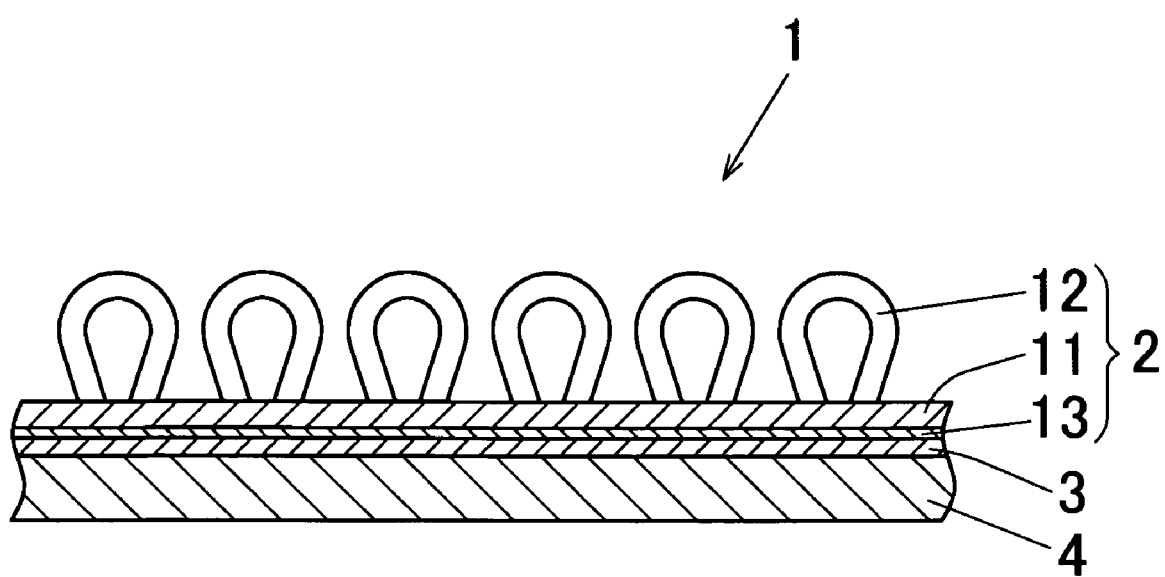
FIG. 1 is a cross-sectional view showing an embodiment of an automobile floor carpet according to the present invention.

An embodiment of a first manufacturing method of an automobile floor carpet 1 according to the present invention will be explained.

In this manufacturing method, initially, a surface skin material 2 in which pile 12 is implanted in an upper surface of a base fabric 11 and a precoated layer 13 is formed on a lower surface of the base fabric 11 by precoat processing. This surface skin layer 2 has air permeability.

Figure 2:
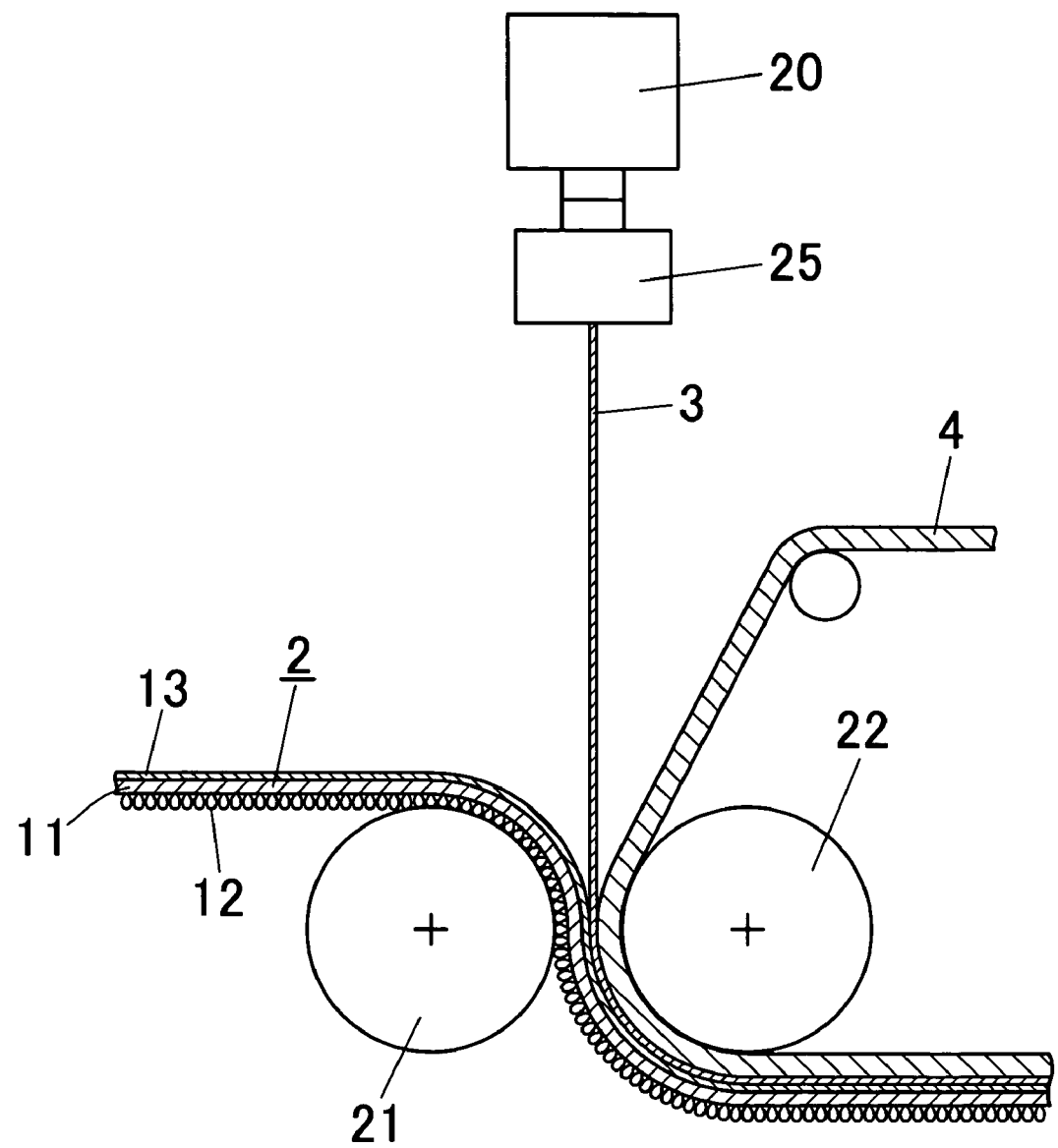
FIG. 2 is an explanatory view showing a manufacturing method of the automobile floor carpet according to the present invention.

Next, as shown in FIG. 2, an adhesive film 3 of thermoplastic resin having a melt flow rate (MFR) of 10 to 1,000 g/10 min is extruded from an extruder 20. On the other hand, while supplying the surface skin layer 2 from the left direction in FIG. 2, a nonwoven fabric 4 is supplied from the right direction in FIG. 2. The surface skin layer 2 and the nonwoven fabric 4 are pressed with a pair of rolls 21 and 22 with the adhesive film 3 obtained immediately after the extrusion interposed between the surface skin material 2 and the nonwoven fabric 4 to thereby obtain an automobile floor carpet 1.

At this time, the surface skin material 2 is disposed so that the precoated layer 13 comes into contact with the adhesive film 3. The obtained automobile floor carpet 1 has a structure in which the surface skin layer 2 and the sound absorbing nonwoven fabric layer 4 are integrally bonded via the adhesive film layer 3 as shown in FIG. 1.

The adhesive film 3 obtained immediately after the extrusion from the extruder 20 is in a molten and softened state. However, since the melt flow rate of the thermoplastic resin constituting the adhesive film 3 is 10 to 1,000 g/10 min and the fluidity in the molten state is large, a number of permeable pores will be generated in the adhesive film 3 at the time of being pressed with the rolls 21 and 22, which enables integral bonding of the nonwoven fabric 4 and the surface skin material 2 with the adhesive film 3 having the aforementioned permeable pores. In an automobile floor carpet 1 according to the present invention obtained by bonding the nonwoven fabric 4 and the surface skin material 2 with the adhesion film 3 having permeable pores formed by the aforementioned method, among other things, since the air permeability as a carpet can be controlled so as to fall within an appropriate range, it is excellent in sound absorption performance and also excellent in sound insulation performance, resulting in sufficient quietness of a passenger compartment. Although the permeable pore generation mechanism in the adhesive film 3 is not clear, it is supposed that the adhesive film 3 will be deformed so as to sufficiently fit on the uneven bonding surfaces of the nonwoven fabric 4 and/or the uneven bonding surface of the surface skin layer 2 due to the large fluidity of the thermoplastic resin constituting the adhesive film 3 in the heated and molten state and the permeable pores will be formed due to generation of, e.g., cracks and perforations at the time of the deformation.

Furthermore, according to the aforementioned first manufacturing method, an automobile floor carpet 1 having a thickness directional air-flow resistance of 600 to 12,450 N·s·m$^{-3}$ can be easily manufactured. In cases where the thickness directional air-flow resistance of an automobile floor carpet 1 is 600 to 12,450 N·s·m$^{-3}$, the sound absorption performance and the sound insulation performance are further enhanced. Among other things, it is more preferable that the thickness directional air-flow resistance of the carpet 1 is 1,245 to 12,450 N·s·m$^{-3}$. In this case, further enhanced sound absorption performance can be secured.

In the aforementioned first manufacturing method, the thermoplastic resin to be extruded is not specifically limited so long as it is thermoplastic resin having a melt flow rate (MFR) of 10 to 1,000 g/10 min. Although the kinds of resin are not specifically limited, examples include polyethylene, polypropylene, ethylene-vinyl acetate copolymer, ethylene methacrylate copolymer, ethylene methyl methacrylate copolymer, and ethylene ethyl acrylate copolymer. It is especially preferable that the melt flow rate of the thermoplastic resin is 100 to 1,000 g/10 min, more preferably 200 to 600 g/10 min. In cases where the thermoplastic rein contains foaming ingredients and/or fillers mentioned below, it is necessary that the melt flow rate (MFR) in a state in which these ingredients are contained is 10 to 1,000 g/min.

As the thermoplastic resin, it is preferable to use thermoplastic resin containing at least one foaming ingredient selected from the group consisting of an inorganic foaming agent, an organic foaming agent and a thermal expansion microcapsule. In this case, the foaming ingredient contained in the thermoplastic resin causes generation of bubbles in the adhesive film 3 to be obtained by extruding the thermoplastic resin. The bubbles become starting points (cores) for forming permeable pores, which enhances generation of permeable pores in the adhesive film 3 at the time of being pressed with rolls 21 and 22. As a result, more permeable pores will be formed in the adhesive film 3, which further improves the sound absorption performance. It is preferable that the foaming ingredient contains by 0.5 to 5 mass parts to the thermoplastic resin 100 mass parts.

As to the inorganic foaming agent, although it is not specifically limited, inorganic carbonate, such as, e.g., sodium hydrogen carbonate, can be exemplified. As to the organic foaming agent, although it is not specifically limited, azodicarbonamide, etc., can be exemplified.

Furthermore, the thermal expansion microcapsule is formed by encapsulating gas, such as, e.g., low boiling point hydrocarbon, in a resin film shell. When heated, the resin film is softened and the inner gas pressure increases to cause expansion foaming. As the resin forming the film shell of the thermal expansion microcapsule, although it is not specifically limited, for example, polyacrylonitrile can exemplified. As the thermal expansion microcapsule having a polyacrylonitrile resin film shell, for example, EXPANCEL 930 MB120 (manufactured by Japan Fillite Co., Ltd.) can be exemplified.

The foaming rate of the foaming using the aforementioned foaming ingredient is preferably set to 1.1 to 5. That is, it is preferable that the adhesive film 3 obtained immediately after the extrusion is a film having a foaming rate of 1.1 to 5. The forming rate of 1.1 or above facilitates formation of permeable pores in the adhesive film 3 at the time of being pressed, resulting in sufficient sound absorption performance, and the forming rate of 5 or less secures sufficient bonding strength. Among other things, it is more preferable that the foaming rate of the foaming using the aforementioned foaming ingredient is set to 1.5 to 3.

In cases where the thermoplastic resin to be extruded contains filler, since the filler in the adhesive film 3 becomes starting points (cores) for forming permeable pores, permeable pores can be more easily formed in the adhesive film 3 at the time of being pressed with the rolls, resulting in further enhanced sound absorption performance. As to the filler, although it is not specifically limited, for example, calcium carbonate, aluminum hydroxide, barium sulfate, talc, and mica can be exemplified.

The blending quantity of the filler is preferably set to 10 to 250 mass parts with respect to the thermoplastic resin of 100 mass parts. The blending quantity of 10 mass parts or more enhances the formation of permeable pores in the adhesive film 3 at the time of being pressed, resulting in sufficient sound absorption performance, while the blending quantity of 250 mass parts or less can secure sufficient bonding strength.

As to the filler, it is preferable to use filler having a particle diameter (major axis) of 1 to 2,000 μm. The particle diameter of 1 μm or more enhances the formation of permeable pores in the adhesive film 3 at the time of being pressed, while the particle diameter of 2,000 μm or less can secure sufficient bonding strength. Among other things, as the filler, it is preferable to use filler having a particle diameter (major axis) of 50 to 500 μm.

Petroleum resin, oil and fat (e.g., stearic acid), hydrocarbon system oil, etc. can be added to the thermoplastic resin.

Next, an example of a second manufacturing method of an automobile floor carpet 1 according to the present invention will be explained.

In this manufacturing method, initially, a surface skin material 2 in which pile 12 is implanted in an upper surface of a base fabric 11 and a precoated layer 13 is formed on a lower surface of the base fabric 11 by precoat processing is prepared. This surface skin layer 2 has air permeability.

Next, as shown in FIG. 2, an adhesive film 3 of thermoplastic resin having a melt flow rate (MFR) of 5,000 to 30,000 mPa·s is extruded from an extruder 20. On the other hand, while supplying the surface skin layer 2 from the left direction in FIG. 2, a nonwoven fabric 4 is supplied from the right direction in FIG. 2. The surface skin layer 2 and the nonwoven fabric 4 are pressed with a pair of rolls 21 and 22 with the adhesive film 3 obtained immediately after the extrusion interposed between the surface skin material 2 and the nonwoven fabric 4 to thereby obtain an automobile floor carpet 1. At this time, the surface skin material 2 is disposed so that the precoated layer 13 comes into contact with the adhesive film 3. The obtained automobile floor carpet 1 has a structure in which the surface skin layer 2 and the sound absorbing nonwoven fabric layer 4 are integrally bonded via the adhesive film layer 3 as shown in FIG. 1.

The adhesive film 3 obtained immediately after the extrusion from the extruder 20 is in a molten and softened state. However, since the melt viscosity of the thermoplastic resin constituting the adhesive film 3 at the extrusion temperature is 5,000 to 30,000 mPa·s, a number of permeable pores will be generated in the adhesive film 3 at the time of being pressed with the rolls 21 and 22, which enables integral bonding of the nonwoven fabric 4 and the surface skin material 2 with the adhesive film 3 having the aforementioned permeable pores. In an automobile floor carpet 1 according to the present invention obtained by bonding the nonwoven fabric 4 and the surface skin material 2 with the adhesion film 3 having permeable pores formed by the aforementioned method, among other things, since the air permeability as a carpet can be controlled so as to fall within an appropriate range, it is excellent in sound absorption performance and also excellent in sound insulation performance, resulting in sufficient quietness in a passenger compartment. Although the permeable pore generation mechanism in the adhesive film 3 is not clear, since the melt viscosity of the thermoplastic resin constituting the adhesive film 3 at the extrusion temperature falls within the range of 5,000 to 30,000 mPa·s, it is supposed that the adhesive film 3 will be deformed so as to sufficiently fit on the uneven bonding surface of the nonwoven fabric 4 and/or the uneven bonding surface of the surface skin layer 2 due to the large fluidity of the thermoplastic resin constituting the adhesive film 3 in the heated and molten state and the permeable pores will be formed due to generation of, e.g., cracks and perforations at the time of the deformation.

Furthermore, according to the aforementioned second manufacturing method, an automobile floor carpet 1 having thickness directional air-flow resistance of 600 to 12,450 N·s·m$^{-3}$ can be easily manufactured. In cases where the thickness directional air-flow resistance of an automobile floor carpet 1 is 600 to 12,450 N·s·m$^{-3}$, the sound absorption performance and the sound insulation performance are further enhanced. Among other things, it is more preferable that the thickness directional air-flow resistance of the carpet 1 is 1,245 to 12,450 N·s·m$^{-3}$. In this case, further enhanced sound absorption performance can be secured.

In the aforementioned second manufacturing method, the thermoplastic resin to be extruded is not specifically limited so long as it is thermoplastic resin having a melt viscosity of 5,000 to 30,000 mPa·s at the extrusion temperature. Although the kinds of thermoplastic resin are not specifically limited, examples include polyethylene, polypropylene, ethylene-vinyl acetate copolymer, ethylene methacrylate copolymer, ethylene methyl methacrylate copolymer, and ethylene ethyl acrylate copolymer. It is especially preferable that the melt viscosity of the thermoplastic resin at the extrusion temperature is 7,000 to 10,000 mP·s. The extrusion temperature usually falls within the range of from 160 to 250° C. Furthermore, the melt viscosity is a value measured in accordance with JIS K6862 B method.

In this invention, it is preferable that the adhesive film 3 is 50 to 500 g/m$^2$ in weight per unit area. The adhesive film 50 g/m$^2$ or more in weight per unit area can secure sufficient bonding strength, and the adhesive film 500 g/m$^2$ or less in weight per unit area enhances formation of permeable pores at the time of being pressed, resulting in sufficient sound absorption performance.

As to the nonwoven fabric 4, although it is not specifically limited, a needle-punched nonwoven fabric or a spunbonded nonwoven fabric can be used for example. This nonwoven fabric 4 is preferably set to the range of 50 to 2,000 g/m$^2$ in weight per unit area. The weight per unit area of 50 g/m$^2$ or more brings about sufficient sound absorption performance, and the weight per unit area of 2,000 g/m$^2$ or less attains sufficient air permeability, resulting in excellent sound absorption performance.

It is preferable that the fineness of fibers constituting the nonwoven fabric 4 falls within the range of 0.1 to 30 decitex. The fineness of 0.1 decitex or more secures sufficient strength of a nonwoven fabric, and the fineness of 30 decitex or less secures sufficient sound absorption performance. Among other things, it is preferable that the fineness of fibers constituting the nonwoven fabric 4 falls within the range of 0.1 to 15 decitex.

As to the surface skin material 2, although it is not specifically limited, a carpet original fabric in which pile 12 is implanted in an upper surface of a base fabric 11, a carpet original fabric in which pile 12 is implanted in an upper surface of a base fabric 11 and a precoated layer 13 is formed on a lower surface of the base fabric 11 by precoat processing (see FIG. 1), a needle-punched nonwoven fabric, a woven fabric, a knitted fabric, electrodeposited carpet, or the like, can be used.

The weight per unit area of the base fabric 11 is preferably set to 50 to 200 g/m$^2$. By setting the weight per unit area to 50 g/m$^2$ or more, pile 12 can be implanted in the base fabric 11 in a stably supported manner. On the other hand, by setting the weight per unit area to 200 g/m$^2$ or less, sufficient air permeability can be obtained, resulting in sufficient sound absorption performance. Furthermore, the weight per unit area of the pile 12 is preferably set to the range of 200 to 4,000 g/m$^2$. The precoated layer 13 is a coat layer formed by applying emulsion or solution of synthetic resin or rubber.

In cases where a needle-punched nonwoven fabric is used as the surface skin material 2, the weight per unit area of the needle-punched nonwoven fabric is preferably set to the range of 50 to 1,000 g/m$^2$. By setting it to this range, the sound absorption performance can be further improved.

In the aforementioned manufacturing methods, the distance from the extrusion outlet of the die 25 of the extruder 20 to the pressing point of the pair of rolls 21 and 22 is usually set to the range of 1 to 500 mm (see FIG. 2). Furthermore, the clearance between the pair of rolls 21 and 22 is usually set to the range exceeding 0 mm but not exceeding 10 mm.

An automobile floor carpet according to the present invention can be used as a carpet to be disposed, for example, on a driver's floor or a passenger's floor in an interior of an automobile.

Next, concrete examples of the present invention will be explained, but it should be understood that the present invention is not limited to them.

Example 1

A surface skin material 2 was obtained by forming a pre-coated layer 13 having a dry weight per unit area of 50 g/m² by pre-coating SBR latex on a rear surface of a fabric in which nylon fiber pile 12 having a weight per unit area of 295 g/m² was tufted in a base fabric 11 of a PET (polyethylene terephthalate) fiber spunbonded nonwoven fabric having a weight per unit area of 100 g/m².

Then, as shown in FIG. 2, while downwardly extruding a polyethylene adhesive film 3 having a melt flow rate of 200 g/10 min and a weight per unit area of 200 g/m² from a T-die 25 of the extruder 20, supplying the surface skin material 2 from the left side of the drawing, and supplying a polyester nonwoven fabric 4 having a weight per unit area of 300 g/m² from the right side of the drawing, the adhesive film 3, the surface skin material 2 and the polyester nonwoven fabric 4 were pressed by a pair of rollers 21 and 22 with the adhesive film 3 disposed between the surface skin material 2 and the sound absorbing nonwoven fabric 4 to be integrally bonded. Thus, an automobile floor carpet 1 shown in FIG. 1 was obtained.

Examples 2-11, Comparative Examples 1-6

An automobile floor carpet 1 was obtained in the same manner as in Example 1 except that resin having a composition shown in Tables 1-3 and a melt flow rate shown in Tables 1-3 was extruded from a T-die 25 of an extruder 20 to thereby form an adhesive film 3. The weight per unit area of each adhesive film was 200 g/m². As the thermal expansion microcapsule, EXPANCEL 930 MB120 (manufactured by Japan Fillite Co., Ltd.) was used.

Comparative Example 7

A surface skin material was obtained by forming a pre-coated layer having a dry weight per unit area of 50 g/m² by pre-coating SBR latex on a rear surface of a fabric in which nylon fiber pile 12 having a weight per unit area of 295 g/m² was tufted in a base fabric of a PET (polyethylene terephthalate) fiber spunbonded nonwoven fabric having a weight per unit area of 100 g/m².

Next, while transferring the surface skin material with the pile surface facing down at a constant rate, polyethylene powder having an average diameter of 500 μm was sprayed on the surface skin material at a spraying amount of 250 g/m². After heating this powder, a polyester nonwoven fabric having a weight per unit area of 300 g/m² was piled thereon, the surface skin material and the polyester nonwoven fabric were pressed with cooling pressure rolls. Thus, an automobile floor carpet was obtained.

Comparative Example 8

A surface skin material was obtained by forming a pre-coated layer having a dry weight per unit area of 80 g/m² by pre-coating SBR latex on a rear surface of a needle-punched nonwoven fabric having a weight per unit area of 300 g/m². An automobile floor carpet was obtained by integrally lining a sound absorbing compound layer (a compound layer made of a resin composition containing calcium carbonate of 150 mass parts with respect to EVA resin of 100 mass parts) having a weight per unit area of 1,000 g/m² on the rear surface of the precoated layer of the surface skin layer.

TABLE 1

|  |  |  | Comp. Ex. 1 | Ex. 1 | Ex. 2 | Ex. 3 | Comp. Ex. 2 | Comp. Ex. 7 | Comp. Ex. 8 |
|---|---|---|---|---|---|---|---|---|---|
| Resin composition | Mass parts | Polyethylene | 200 | 200 | 200 | 200 | 200 | | |
|  |  | Sodium hydrogen carbonate | — | — | — | — | — | | |
|  |  | Azodicarbonamid | — | — | — | — | — | | |
|  |  | Microcapsule | — | — | — | — | — | | |
|  |  | Calcium carbonate | — | — | — | — | — | | |
| Resin melt flow rate (g/10 min) | | | 5 | 200 | 500 | 700 | 1,200 | | |
| Evaluation | Air-flow resistance (N·s·m⁻³) | | ∞ | 4766 | 3800 | 2595 | Even extruded adhesive film was not obtained | 335 | ∞ |
|  | Transmission loss (dB) | 1,000 Hz | 23 | 22 | 37 | 35 |  | 5 | 13 |
|  |  | 2,000 Hz | 11 | 21 | 26 | 22 |  | 5 | 20 |
|  |  | 4,000 Hz | 23 | 30 | 31 | 30 |  | 6 | 25 |
|  | Normal incidence sound absorption coefficient | 1,000 Hz | 0.06 | 0.13 | 0.13 | 0.18 |  | 0.09 | 0.06 |
|  |  | 2,000 Hz | 0.12 | 0.25 | 0.26 | 0.27 |  | 0.17 | 0.26 |
|  |  | 4,000 Hz | 0.30 | 0.45 | 0.45 | 0.31 |  | 0.46 | 0.22 |

TABLE 2

|  |  |  | Comp. Ex. 3 | Ex. 4 | Ex. 5 | Ex. 6 | Ex. 7 | Ex. 8 | Comp. Ex. 4 |
|---|---|---|---|---|---|---|---|---|---|
| Resin composition | Mass parts | Polyethylene | 200 | 200 | 200 | 200 | 200 | 200 | 200 |
|  |  | Sodium hydrogen carbonate | 0.4 | 0.4 | 0.4 | 0.4 | — | — | 0.4 |
|  |  | Azodicarbonamid | — | — | — | — | 0.5 | — | — |
|  |  | Microcapsule | — | — | — | — | — | 0.6 | — |
|  |  | Calcium carbonate | — | — | — | — | — | — | — |

TABLE 2-continued

|  |  | Comp. Ex. 3 | Ex. 4 | Ex. 5 | Ex. 6 | Ex. 7 | Ex. 8 | Comp. Ex. 4 |
|---|---|---|---|---|---|---|---|---|
| Resin melt flow rate (g/10 min) |  | 5 | 50 | 200 | 500 | 200 | 200 | 1,200 |
| Foaming rate of adhesive film (times) |  | 1.03 | 1.12 | 1.15 | 1.22 | 1.41 | 1.18 | Even extruded adhesive film was not obtained |
| Evaluation | Air-flow resistance ($N \cdot s \cdot m^{-3}$) | ∞ | 3249 | 2809 | 2142 | 2791 | 2499 |  |
|  | Transmission loss (dB) 1,000 Hz | 19 | 30 | 29 | 27 | 26 | 30 |  |
|  | 2,000 Hz | 12 | 15 | 15 | 13 | 18 | 16 |  |
|  | 4,000 Hz | 22 | 29 | 26 | 25 | 28 | 33 |  |
|  | Normal incidence sound absorption coefficient 1,000 Hz | 0.06 | 0.13 | 0.16 | 0.14 | 0.15 | 0.17 |  |
|  | 2,000 Hz | 0.11 | 0.28 | 0.35 | 0.35 | 0.34 | 0.27 |  |
|  | 4,000 Hz | 0.25 | 0.39 | 0.36 | 0.53 | 0.41 | 0.37 |  |

TABLE 3

|  |  |  | Comp. Ex. 5 | Ex. 9 | Ex. 10 | Ex. 11 | Comp. Ex. 6 |
|---|---|---|---|---|---|---|---|
| Resin composition | Mass parts | Polyethylene | 200 | 200 | 200 | 200 | 200 |
|  |  | Sodium hydrogen carbonate | — | — | — | — | — |
|  |  | Azodicarbonamid | — | — | — | — | — |
|  |  | Microcapsule | — | — | — | — | — |
|  |  | Calcium carbonate | 65 | 65 | 65 | 65 | 65 |
| Resin melt flow rate (g/10 min) |  |  | 5 | 50 | 200 | 500 | 1,200 |
| Evaluation | Air-flow resistance ($N \cdot s \cdot m^{-3}$) |  | ∞ | 4281 | 4,152 | 4,571 | Even extruded adhesive film was not obtained |
|  | Transmission loss (dB) | 1,000 Hz | 13 | 23 | 33 | 28 |  |
|  |  | 2,000 Hz | 9 | 20 | 17 | 15 |  |
|  |  | 4,000 Hz | 19 | 29 | 28 | 33 |  |
|  | Normal incidence sound absorption coefficient | 1,000 Hz | 0.06 | 0.20 | 0.16 | 0.16 |  |
|  |  | 2,000 Hz | 0.09 | 0.26 | 0.26 | 0.29 |  |
|  |  | 4,000 Hz | 0.25 | 0.44 | 0.45 | 0.42 |  |

Example 12

While downwardly extruding a polyethylene adhesive film 3 having a weight melt flow rate of 200 g/10 min and a weight per unit area of 200 g/m² from a T-die 25 of the extruder 20, supplying a surface skin material 2 made of a needle-punched nonwoven fabric having a weight per unit area of 300 g/m² from the left side of the drawing, and supplying a polyester nonwoven fabric 4 having a weight per unit area of 300 g/m² from the right side of the drawing, the adhesive film 3, the surface skin material 2 and the polyester nonwoven fabric 4 were pressed by a pair of rollers 21 and 22 with the adhesive film 3 disposed between the surface skin layer 2 and the polyester nonwoven fabric 4 to be integrally bonded (see FIG. 2). Thus, an automobile floor carpet 1 was obtained.

Comparative Example 9

While transferring a surface skin material 2 made of a needle-punched nonwoven fabric having a weight per unit area of 300 g/m² at a constant rate, polyethylene powder having an average diameter of 500 μm was sprayed on the surface skin material at a spraying amount of 250 g/m². After heating this powder, a polyester nonwoven fabric having a weight per unit area of 300 g/m² was piled thereon, the surface skin material and the polyester nonwoven fabric were pressed with cooling pressure rolls. Thus, an automobile floor carpet was obtained.

TABLE 4

|  |  |  | Comp. Ex. 12 | Ex. 9 |
|---|---|---|---|---|
| Resin composition | Mass parts | Polyethylene | 200 | — |
|  |  | Sodium hydrogen carbonate | — | — |
|  |  | Azodicarbonamid | — | — |
|  |  | Microcapsule | — | — |
|  |  | Calcium carbonate | — | — |
| Resin melt flow rate (g/10 min) |  |  | 200 |  |
| Evaluation | Air-flow resistance ($N \cdot s \cdot m^{-3}$) |  | 4,337 | 493 |
|  | Transmission loss (dB) | 1,000 Hz | 30 | 8 |
|  |  | 2,000 Hz | 14 | 7 |
|  |  | 4,000 Hz | 31 | 9 |
|  | Normal incidence sound absorption coefficient | 1,000 Hz | 0.11 | 0.08 |
|  |  | 2,000 Hz | 0.28 | 0.16 |
|  |  | 4,000 Hz | 0.63 | 0.47 |

Example 13

A surface skin material 2 was obtained by forming a pre-coated layer 13 having a dry weight per unit area of 50 g/m² by pre-coating SBR latex on a rear surface of a fabric in which nylon fiber pile 12 having a weight per unit area of 295 g/m² was tufted in a base fabric 11 of a PET (polyethylene terephthalate) fiber spunbonded nonwoven fabric having a weight per unit area of 100 g/m².

Then, as shown in FIG. 2, while downwardly extruding a polyethylene adhesive film 3 having a melt viscosity of 26,100 mPa·s at the extrusion temperature (240° C.) and a weight per unit area of 200 g/m² from a T-die 25 of the extruder 20 under a condition of the extrusion temperature of 240° C., supplying the surface skin material 2 from the left side of the drawing, and supplying a polyester nonwoven fabric 4 having a weight per unit area of 300 g/m² from the right side of the drawing, the adhesive film 3, the surface skin material 2 and the sound absorbing nonwoven fabric 4 are pressed by a pair of rollers 21 and 22 with the adhesive film 3 disposed between the surface skin layer 2 and the sound absorbing nonwoven fabric 4 to be integrally bonded. Thus, an automobile floor carpet 1 shown in FIG. 1 was obtained.

Example 14, 15, Comparative Example 10, 11

An automobile floor carpet 1 was obtained in the same manner as in Example 1 except that an adhesive film 3 was formed by extruding resin having melt viscosity shown in Table 5 and a composition shown in Table 5 from a T-die 25 of an extruder. The weight per unit area of the adhesive film was set to 200 g/m². The extrusion temperature was set to 240° C.

The air permeability V can be said to an air velocity v.

$$V=1 \text{ cm}^3/\text{cm}^2\cdot\text{sec}$$

$$V=1 \text{ cm/sec}$$

The air-flow resistance R is air pressure P/air velocity v.

$$R=P/v$$

If the air permeability is 1 cm³/cm²·sec, $$R=P/v=124.5 \text{ Pa}/1 \text{ cm/sec}=124.5 \text{ Pa/cm/sec}=12,450 \text{ Pa/m/sec}=12,450\text{N/m}^3/\text{sec}.$$

Thus, R=12,450/V

<Sound Absorbing Rate Measuring Method>

Normal incidence sound absorption coefficient at each frequency was measured in accordance with ISO 10534-2.

<Transmission Loss Measuring Method (Sound Insulation Performance Evaluation Method)>

Transmission loss (dB) at each frequency was obtained by performing transmission loss measurement by a pipe method using an impedance tube (acoustic tube).

TABLE 5

| | | | Comp. Ex. 10 | Ex. 13 | Ex. 14 | Ex. 15 | Comp. Ex. 11 |
|---|---|---|---|---|---|---|---|
| Resin composition | Mass parts | Polyethylene | 200 | 200 | 200 | 200 | 200 |
| | | Sodium hydrogen carbonate | — | — | — | — | — |
| | | Azodicarbonamid | — | — | — | — | — |
| | | Microcapsule | — | — | — | — | — |
| | | Calcium carbonate | — | — | — | — | — |
| Melt viscosity (mPa·s) | | | 35,300 | 26,100 | 14,700 | 6,200 | 4,800 |
| Evaluation | Air-flow resistance (N·s·m⁻³) | | ∞ | 4,766 | 3,141 | 1,014 | Even extruded adhesive film was not obtained |
| | Transmission loss (dB) | 1,000 Hz | 20 | 22 | 29 | 28 | |
| | | 2,000 Hz | 16 | 21 | 12 | 12 | |
| | | 4,000 Hz | 21 | 30 | 31 | 29 | |
| | Normal incidence sound absorption coefficient | 1,000 Hz | 0.04 | 0.13 | 0.11 | 0.08 | |
| | | 2,000 Hz | 0.11 | 0.25 | 0.25 | 0.15 | |
| | | 4,000 Hz | 0.24 | 0.45 | 0.37 | 0.37 | |

*1) Melt viscosity . . . Melt viscosity at the extrusion temperature of 240° C.

Each automobile floor carpet (except for Comparative Examples 2, 4, 6 and 11) obtained as mentioned above was evaluated based on the following evaluation method. In Comparative Examples 2, 4, 6 and 11, an even extruded adhesive film could not be obtained, and therefore an automobile floor carpet bonded in a good condition could not be obtained.

<Air-Flow Resistance Value Measuring Method>

The air permeability V (cm³/cm²·sec) was measured in accordance with JIS L1096-1999, 8.27.1 A method, and then the air-flow resistance value R (N·s·m⁻³) was obtained by the following conversion formula.

$$R=12,450/V$$

This conversion formula was obtained as follows. That is, at the time of measuring the air permeability, the pressure P is as follows:

$$P=1.27 \text{ cmH}_2\text{O}=1.27 \text{ g/cm}^2=12.7 \text{ kg/m}^2=124.5\text{N/m}^2=124.5 \text{ Pa}$$

As will be apparent from Tables, automobile floor carpets according to Examples 1-15 of the present invention were excellent in sound absorption performance and also excellent in sound insulation performance.

To the contrary, in the carpets according to Comparative Examples 7 and 9 in which the surface skin material and the nonwoven fabric layer were integrally bonded with powder, although the sound absorption performance was excellent, the transmission loss was small and therefore the sound insulation performance was poor. Furthermore, in the so-called sound insulation carpet according to Comparative Example 8, although the sound insulation performance was excellent, the sound absorption performance was not sufficient.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A method of manufacturing an automobile floor carpet, comprising the steps of:
providing a thermoplastic resin containing at least one foaming ingredient selected from the group consisting of an inorganic foaming agent, an organic foaming agent and a thermal expansion microcapsule in an amount 0.5-5 mass parts with respect to 100 mass parts of the thermoplastic resin and containing a filler having a major axis particle diameter of 50 to 500 μm in an amount of 10-250 mass parts with respect to 100 mass parts of the thermoplastic resin; and
pressing a nonwoven fabric, an adhesive film obtained immediately after extruding the thermoplastic resin having a melt flow rate of 10 to 1,000 g/10 min from an extruder, wherein the adhesive film is 50 to 500 g/m² in weight per unit area and has a foaming rate of 1.1 to 5 and a surface skin material piled together in this order with a pair of rollers,
thereby obtaining an automobile floor carpet having an air-flow resistance of 1,245 to 12,450 N·s·m⁻³.

2. The method of manufacturing an automobile floor carpet as recited in claim 1, wherein the melt flow rate of the thermoplastic resin is 100 to 1,000 g/10 min.

3. The method of manufacturing an automobile floor carpet as recited in claim 1, wherein the nonwoven fabric is 0.1 to 30 decitex in fineness of constituent fiber and 50 to 2,000 g/m² in weight per unit area.

4. The method of manufacturing an automobile floor carpet as recited in claim 1, wherein a carpet original fabric in which piles 200 to 4,000 g/m² in weight per unit area is implanted in an upper surface of a base fabric 50 to 200 g/m² in weight per unit area is used as the surface skin material.

5. The method of manufacturing an automobile floor carpet as recited in claim 1, wherein a needle-punched nonwoven fabric 50 to 1,000 g/m² in weight per unit area is used as the surface skin material.

6. The method of manufacturing an automobile floor carpet as recited in claim 1, wherein, the thermoplastic resin contains a thermal expansion microcapsule as a foaming ingredient.

* * * * *